United States Patent
Morgulis et al.

(10) Patent No.: US 9,421,614 B2
(45) Date of Patent: Aug. 23, 2016

(54) CUTTING TOOL, CUTTING INSERT AND TOOL HOLDER

(71) Applicant: Vargus Ltd., Nahariya (IL)

(72) Inventors: Rafael Morgulis, Carmiel (IL); Artur Zaretsky, Nesher (IL)

(73) Assignee: VARGUS Ltd. (IL)

( * ) Notice: Subject to any disclaimer, the term of this patent is extended or adjusted under 35 U.S.C. 154(b) by 142 days.

(21) Appl. No.: 13/892,884

(22) Filed: May 13, 2013

(65) Prior Publication Data

US 2013/0336734 A1  Dec. 19, 2013

(30) Foreign Application Priority Data

May 15, 2012  (EP) ..................................... 12168107

(51) Int. Cl.
    *B23B 27/16*  (2006.01)
    *B23B 27/06*  (2006.01)

(52) U.S. Cl.
    CPC ........... *B23B 27/1651* (2013.01); *B23B 27/065* (2013.01); *B23B 27/1611* (2013.01); *B23B 27/1622* (2013.01); *B23B 2200/049* (2013.01); *B23B 2200/125* (2013.01); *B23B 2200/128* (2013.01); *B23B 2200/369* (2013.01); *B23B 2205/12* (2013.01); *B23B 2205/16* (2013.01); *B23G 2200/10* (2013.01); *Y10T 407/2272* (2015.01); *Y10T 407/23* (2015.01)

(58) Field of Classification Search
    CPC .................. B23B 2200/049; B23B 2200/125; B23B 2200/128; B23B 27/056; B23B 2200/369; B23B 2205/12; B23B 2205/16; B23B 27/1611; B23B 27/1622; B23B 27/1651; B23G 2200/10

USPC ............................. 407/24, 25, 113, 102–104
    See application file for complete search history.

(56) References Cited

U.S. PATENT DOCUMENTS

| | | | | |
|---|---|---|---|---|
| 3,436,799 A | * | 4/1969 | Kopy | 407/77 |
| 3,484,919 A | * | 12/1969 | Stier | 407/77 |
| 3,520,042 A | * | 7/1970 | Stier | 407/89 |
| 3,613,197 A | * | 10/1971 | Stier | 407/113 |
| 4,169,690 A | * | 10/1979 | Kendra | 407/90 |
| 4,393,735 A | * | 7/1983 | Eckle et al. | 82/158 |
| 4,462,725 A | * | 7/1984 | Satran et al. | 407/92 |
| 4,674,924 A | * | 6/1987 | Carlsson et al. | 407/114 |
| 4,755,085 A | * | 7/1988 | Muren et al. | 407/113 |

(Continued)

FOREIGN PATENT DOCUMENTS

JP  4383129 A  3/2005

OTHER PUBLICATIONS

European Search Report issued in connection with EP 12168107.6.

*Primary Examiner* — Sara Addisu
(74) *Attorney, Agent, or Firm* — Akerman LLP

(57) ABSTRACT

A cutting tool comprising a tool holder (2) with a pocket (22) and a cutting insert (3) in the shape of a polygon having at least three side surfaces (33, 34, 35). The pocket (22) is provided with a base support surface (24) and at least two lateral support surfaces (25, 26). The cutting insert (3) is releaseably securable in the pocket (22) with two side surfaces of the insert (34, 35) abutting the two lateral support surfaces (25, 26) of the pocket (22). At least one of the side surfaces (33, 34, 35) and at least one of the lateral support surfaces (25, 26) are provided with a notch (37) and a complimentary rib element (28) extending in an axial direction of the insert and interacting for providing an end stop of the cutting insert (3) in the pocket (22).

9 Claims, 3 Drawing Sheets

(56) References Cited

U.S. PATENT DOCUMENTS

| | | | |
|---|---|---|---|
| 5,004,379 A * | 4/1991 | Little | 407/113 |
| 5,032,050 A | 7/1991 | Niebauer et al. | |
| 5,163,788 A * | 11/1992 | Dahl et al. | 407/46 |
| 5,201,352 A * | 4/1993 | Hult | 144/218 |
| 5,308,197 A * | 5/1994 | Little | 407/101 |
| 5,505,569 A * | 4/1996 | Gustafsson et al. | 407/113 |
| 5,810,518 A | 9/1998 | Wiman et al. | |
| 6,126,366 A * | 10/2000 | Lundblad | 407/102 |
| 6,527,485 B1 * | 3/2003 | Little | 407/24 |
| 6,607,334 B2 * | 8/2003 | Satran et al. | 407/35 |
| 7,001,115 B2 * | 2/2006 | Erickson et al. | 407/113 |
| D584,752 S * | 1/2009 | Jonsson et al. | D15/139 |
| 7,488,143 B2 * | 2/2009 | Muren et al. | 407/113 |
| 7,591,614 B2 * | 9/2009 | Craig | 407/66 |
| 7,632,046 B2 * | 12/2009 | Andersson et al. | 407/46 |
| 7,645,100 B2 * | 1/2010 | Andersson et al. | 407/66 |
| 7,722,297 B2 * | 5/2010 | Dufour et al. | 407/66 |
| 8,192,114 B2 * | 6/2012 | Chang | 408/224 |
| 8,419,320 B2 * | 4/2013 | Sung et al. | 407/113 |
| 8,439,608 B2 * | 5/2013 | Chen et al. | 407/11 |
| 8,491,231 B2 * | 7/2013 | Edler et al. | 407/103 |
| 8,678,718 B2 * | 3/2014 | Hecht | 407/117 |
| 8,708,617 B2 * | 4/2014 | Choi et al. | 407/114 |
| 8,714,886 B2 * | 5/2014 | Hecht et al. | 407/113 |
| 8,845,243 B2 * | 9/2014 | Hansson | 408/188 |
| 2003/0156910 A1 * | 8/2003 | Friedman et al. | 407/117 |
| 2007/0231089 A1 * | 10/2007 | Hecht | 407/113 |
| 2008/0152441 A1 | 6/2008 | Andersson et al. | |
| 2009/0162154 A1 * | 6/2009 | Jonsson et al. | 407/114 |
| 2009/0252565 A1 * | 10/2009 | Morgulis | 407/100 |
| 2013/0287506 A1 * | 10/2013 | Morgulis et al. | 407/103 |
| 2014/0050542 A1 * | 2/2014 | Zeeb et al. | 407/103 |
| 2014/0186130 A1 * | 7/2014 | Hecht | 407/100 |
| 2014/0348601 A1 * | 11/2014 | Hecht | 407/104 |

* cited by examiner

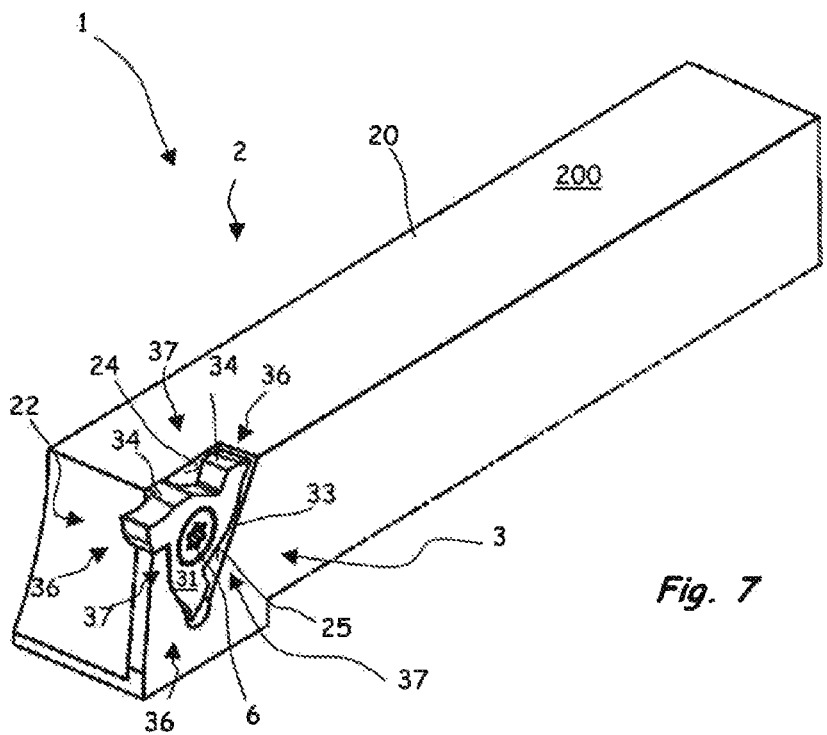
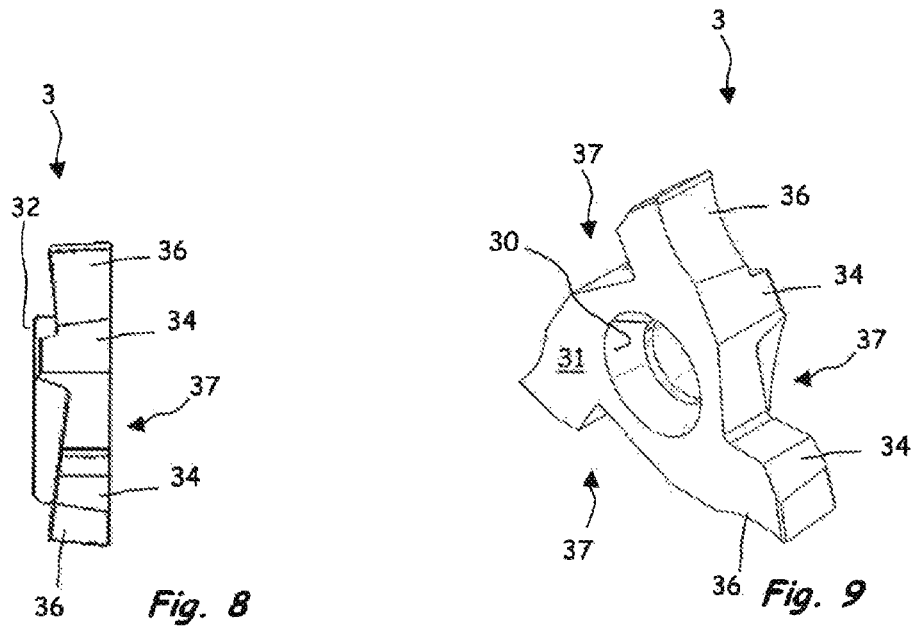
Fig. 7
Fig. 8
Fig. 9

CUTTING TOOL, CUTTING INSERT AND TOOL HOLDER

CROSS REFERENCE TO RELATED APPLICATIONS

This application claims priority to EP 12168107.6, filed May 15, 2012, the entire contents of which is hereby incorporated by reference.

The invention relates to a cutting tool comprising a holder with a pocket and a cutting insert. The invention further relates to a cutting insert and a tool holder for a cutting tool.

Cutting tools comprising a holder with a pocket and a cutting insert that is releaseably securable in the pocket are well known. The cutting insert, or in short the insert, is secured to the pocket using for example a clamping screw and/or a clamping jaw. For a precise positioning of the insert in the pocket, it is known to provide the pocket with a base support surface and two lateral support surfaces, wherein when the insert is placed in the pocket, two side surfaces of the insert abut corresponding lateral support surfaces of the pocket.

Cutting inserts are provided with at least one cutting corner. In preferred embodiments, the cutting inserts have a polygonal basic shape and are provided with a plurality of cutting corners selectively coming in use. It is known for example to provide triangular inserts having with an upper face and a lower face, three side surfaces essentially perpendicular thereto and three cutting corners arranged alternately with the side surfaces.

For example, EP 0 178 273 A2 discloses a thread cutting insert having a triangular basic shape that comprises an upper face and a lower face mainly parallel thereto. The upper and the lower faces are perpendicularly connected by side surfaces. The cutting insert is provided with three identical cutting corners, each arranged with a cutting edge formed at a transition region to the upper face. The cutting edges shall engage with and cut threads in a work piece. The cutting insert is releaseably securable in a cutting tool having a pocket with a base support surface and two lateral support surfaces, wherein when placed in the pocket, two side surfaces of the insert abut corresponding lateral support surfaces of the pocket.

U.S. Pat. No. 5,032,050 discloses an on-edge cutting insert for grooving operations having a triangular basic shape with an upper face and a lower face and three side surfaces essentially perpendicular thereto. At the forward edges of each side surface are a first cutting edge, a second cutting edge, and a third cutting edge. The insert is releaseably securable in a pocket of a tool holder. The pocket has a base support surface—due to its orientation in use referred to as side wall—and two lateral support surfaces referred to as top wall and back wall, respectively, due to the orientation in use. When placed in the pocket, two side surfaces of the insert abut the top wall and the back wall for presenting one cutting edge provided opposite the back wall.

Thread turning and/or grooving both require a high accuracy when positioning the insert at the tool holder and a high rigidity of the cutting tool in order to produce a thread or groove with high quality and to reduce a cycle time.

It is the object of the present invention to provide a cutting tool, a cutting insert and a tool holder, in particular for grooving and/or threading operations, allowing for a high accuracy in positioning and a high rigidity of the cutting tool.

This object is solved by a cutting tool, a cutting insert, and a tool holder with the features of claims 1, 7, and 12.

According to a first aspect of the invention, a cutting tool comprising a tool holder with a pocket and a cutting insert in the shape of a polygon having at least three side surfaces is provided, the pocket having a base support surface and at least two lateral support surfaces, wherein the cutting insert is releaseably securable in the pocket with two side surfaces of the insert abutting the two lateral support surfaces of the pocket, and wherein at least one of the side surfaces and at least one of the lateral support surfaces are provided with a notch and a complimentary rib element extending in an axial direction of the insert and interacting for providing an end stop of the cutting insert in the pocket.

In the context of the invention, the axial direction of the insert is defined as the direction perpendicular to an upper and/or lower face of the insert.

The cutting insert comprises at least one cutting corner, which is provided between two of the side surfaces and presented when securing the insert to the pocket. Preferably, the number of cutting corners matches the number of side surfaces, each one arranged between two consecutive side surfaces. The cutting corners are provided with cutting edges.

In one embodiment, the cutting edges of different cutting corners are identically shaped and ground. In other embodiments, the cutting edges vary in the geometry and/or grinding for providing different cutting properties.

The two lateral support surfaces and the at least one additional end stop realized by the notch/rib element combination provide positional accuracy and repeatability. In addition, in preferred embodiments, at least one central clamping screw and/or at least one clamping jaw are provided for securing the cutting insert in the pocket. Preferably, one of the at least two lateral support surface is provided at a front end of the holder, wherein the length of the lateral support surface is chosen for allowing the presenting of a cutting corner in use adjacent to the lateral support surface.

When positioning prior art inserts in respective pockets with two side surfaces of the insert abutting the two lateral support surfaces of the pocket, a contact of the side surfaces and the lateral support surfaces provides end stops against a movement of the insert relative to the pocket, in particular against a rotational movement about a centre axis when using a central clamping screw. However, the orientation of the side surfaces and the lateral support surfaces and, hence, the end stops thus obtained, with respect to a force acting on the insert in use is determined by the geometry of the cutting insert, more particular the inclination of a cutting corner with respect to a bisector of an opposing side surface. In accordance with the invention, at least one rib element and a corresponding notch are provided, thereby providing additional contact areas and, hence, at least one additional end stop of the cutting insert in the pocket.

In one embodiment, the cutting insert is placed in the pocket, wherein a lower face abuts the base support surface. In other embodiments, an anvil is provided between the cutting insert and the base support surface of the pocket.

In a preferred embodiment, all side surfaces of the cutting insert are provided with at least one notch, each, and one of the lateral support surfaces is provided with a complimentary rib element interacting with one of said notches for providing an end stop of the cutting insert in the pocket. It is known in the prior art to provide indexable cutting inserts with a plurality of cutting corners, wherein the cutting insert is releaseably securable in the pocket of the tool holder for selectively presenting one cutting corner, referred to as active cutting corner, whereas the remaining cutting corners, referred to as passive cutting corners, are received in the pocket. The indexable cutting insert is placeable in the pocket in a plurality of orientations depending on the number of cutting corners provided. By providing notches on the side surfaces of the insert and a rib element on only one lateral support surface of the pocket, the cutting insert may be positioned without redundancy and without any interference with (unused) rib elements. In preferred embodiments, the rib element is provided in the lateral support surface of the pocket supporting the side surface adjacent the active cutting corner for balancing the applied cutting forces close to the force application area.

In preferred embodiments, the pocket is open towards at least one side perpendicular to the base support surface, wherein the rib element has a front face facing towards the open side of the pocket. Providing a pocket having an open side perpendicular to the base support surface allows for a cost efficient manufacturing of the tool holder and a simple and quick positioning of the insert. In preferred embodiments the pocket is open towards a side facing in a feed direction parallel to an axis of the work piece to be machined and towards a top of the tool holder in use. The rib element in one embodiment is provided at the free end of the lateral support surface adjoining the open side of the pocket.

According to a further embodiment, a triangular cutting insert with three cutting corners is provided that is releaseably securable in the pocket for presenting one cutting corner while the other two cutting corners are received in the pocket.

In one preferred embodiment, the cutting insert is a threading insert releaseably securable in the pocket, the pocket having a base support surface that is arranged at least essentially parallel to a top surface of the cutting tool. The cutting insert is arranged inside the pocket with its upper face facing towards a top of the cutting tool. The active cutting corner is presented towards the front. In a preferred embodiment, the pocket has an open side perpendicular to the base support surface facing in a feed direction parallel to an axis of the work piece to be machined, wherein the at least one rib element has a front face facing towards the open side of the pocket. Thereby, a cutting tool for a turning operation with a very high rigidity is provided.

In an alternative embodiment, the cutting insert is a grooving insert releaseably securable in the pocket having a base support surface arranged at least essentially perpendicular to a top surface of the cutting tool. The cutting insert is arranged inside the pocket with its upper face facing in a feed direction parallel to an axis of the work piece to be machined. The cutting corner in use is presented towards the front. In a preferred embodiment, the pocket has an open side perpendicular to the base support surface that opens towards a top of the cutting tool, wherein the at least one rib element has a front face facing towards the open side of the pocket. Thereby a cutting tool for a grooving operation with a very high rigidity is provided.

According to a second aspect, a cutting insert for a cutting tool comprising a tool holder with a pocket having a base support surface and at least two lateral support surfaces is provided, wherein the cutting insert is in the shape of a polygon having an upper face and a lower face at least essentially parallel thereto and at least three side surfaces, wherein the cutting insert is releaseably securable in the pocket with two side surfaces of the insert abutting the two lateral support surfaces of the pocket, and wherein at least one of the side surfaces is provided with a notch and/or a rib element extending in an axial direction of the cutting insert and arranged for interacting with a complimentary rib element and/or a complementary notch of the pocket for providing an end stop of the cutting insert in the pocket.

The cutting insert is in the shape of a polygon, preferably in the shape of an equilateral polygon, more particular a triangle. In the context of the invention, a cutting insert having three side surfaces and three cutting corners arranged alternately is referred to as triangular cutting insert even though due to rib elements and/or notches provided at the side surfaces a number of edges and/or vertices is larger than three. The cutting corners in one embodiment are inclined with respect to the bisectors of opposing side surfaces.

According to one embodiment, all side surfaces are provided with at least one notch, each. Preferably the side surfaces are provided with exactly one notch allowing the size of the notch to be increased. The notch extends in axial direction and, in preferred embodiments, is formed as a wedge-shaped or v-shaped groove. In preferred embodiments, the at least one notch is provided at a middle of each of the side surfaces. The arrangement allows for an optimization of the size of the notch and the respective rib element.

According to one embodiment, the cutting insert is a threading insert having at least three cutting corners provided with a cutting edge at a transition region to the upper surface. According to another embodiment, the cutting insert is a grooving insert having at least three cutting corners at the ends of each side surface with cutting edges extending at least essentially perpendicular to the upper surface.

According to a third aspect, a tool holder for a cutting tool comprising a tool holder and a cutting insert in the shape of a polygon having at least three side surfaces is provided, wherein the tool holder is provided with a pocket having a base support surface and at least two lateral support surfaces, in which pocket the cutting insert is releaseably securable with two side surfaces of the insert abutting the two lateral support surfaces of the pocket, and wherein at least one of the lateral support surfaces is provided with a notch and/or a rib element extending in a direction at least essentially perpendicular to the base support surface and arranged for interacting with a complimentary rib element and/or a complementary notch of the cutting insert for providing an end stop of the cutting insert in the pocket. Preferably, one of the at least two lateral support surface is provided at a front end of the holder, wherein the length of the lateral support surface is chosen for allowing the presenting of a cutting corner in use adjacent to the lateral support surface.

In a preferred embodiment, the pocket is provided at least at one of the lateral support surfaces with a rib element. The rib element is preferably provided at the lateral support surface arranged at a front end of the holder.

In one embodiment, the pocket is open towards at least one side perpendicular to the base support surface, wherein the rib element has a front face facing towards the open side of the pocket. The rib element in one embodiment is provided at the free end of the lateral support surface arranged at a front end of the holder.

The orientation of the front face with respect to an axis of a work piece has a large influence on the rigidity of the cutting tool. In preferred embodiments the front face is in arranged with respect to the axis of the work piece at an angle that is larger than 30°, preferably between 60° and 90°.

In the following, embodiments of the invention will be described in detail based on several schematic drawings in which FIG. 1 is a schematic isometric view of a first embodiment of a cutting tool comprising a tool holder a cutting insert for threading;

Figure 5:
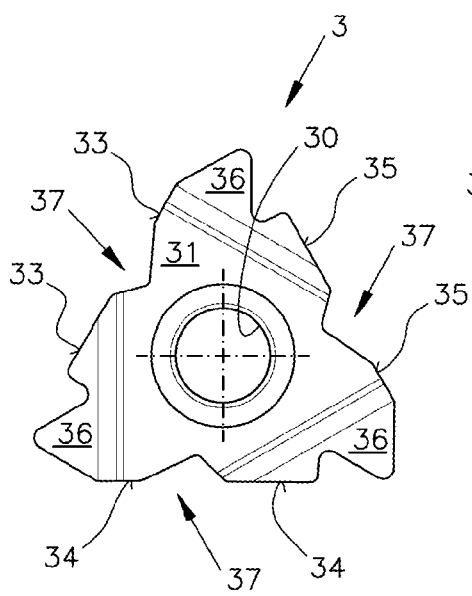
FIG. 5 is a top view of the cutting insert of FIG. 1.
Figure 6:
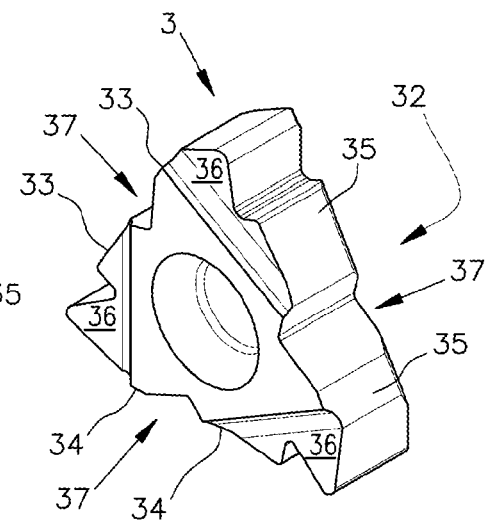

FIG. 6: is an isometric view from the top of the cutting insert of FIG. 5,

FIG. 7 is a schematic isometric view of a second embodiment of a cutting tool comprising a tool holder a cutting insert for grooving.

FIG. 8 is a top view of the cutting insert of FIG. 7 and

FIG. 9: is an isometric view from the side of the cutting insert of FIG. 7.

Throughout the drawings, the same or similar elements will be denoted by the same reference numerals.

Figure 1:
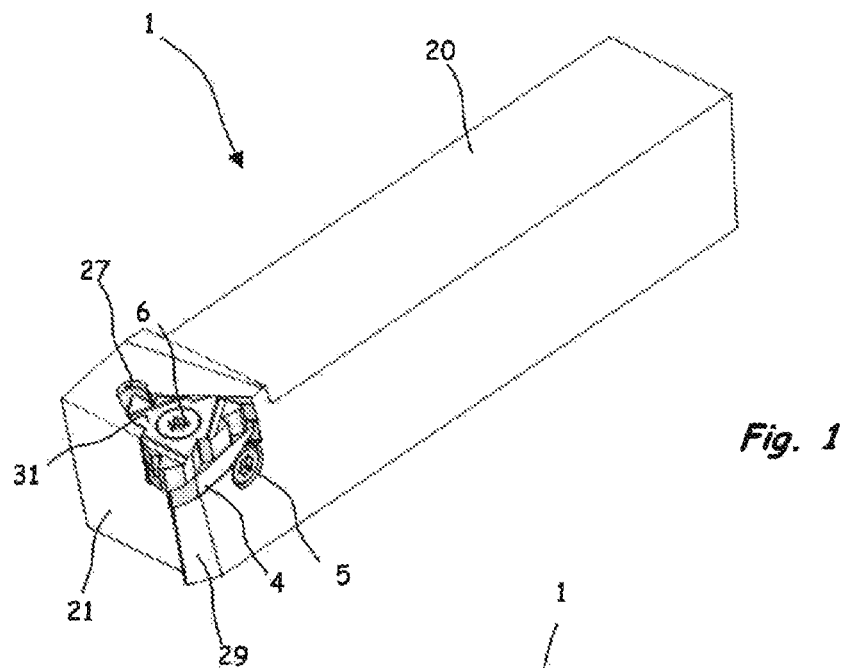
Figure 2:
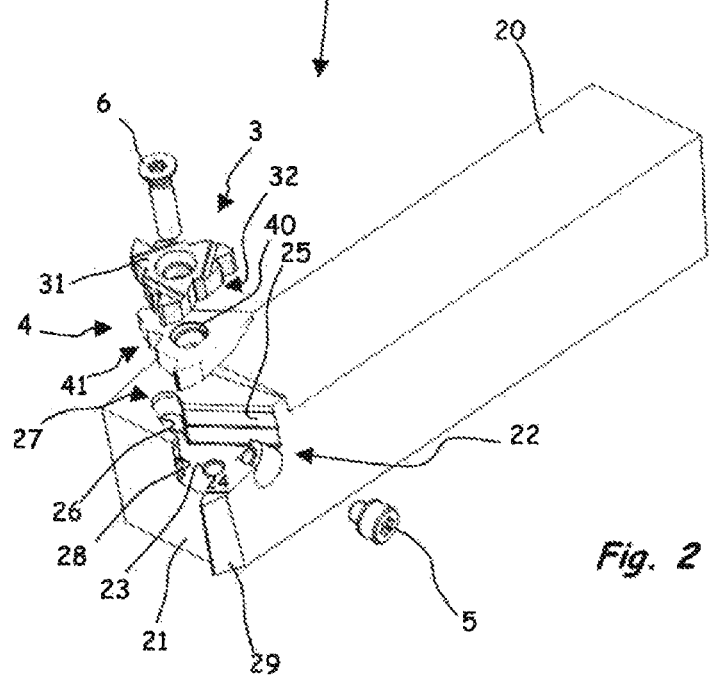
FIG. 2 is an exploded schematic isometric view of the cutting tool of FIG. 1.
Figure 3:
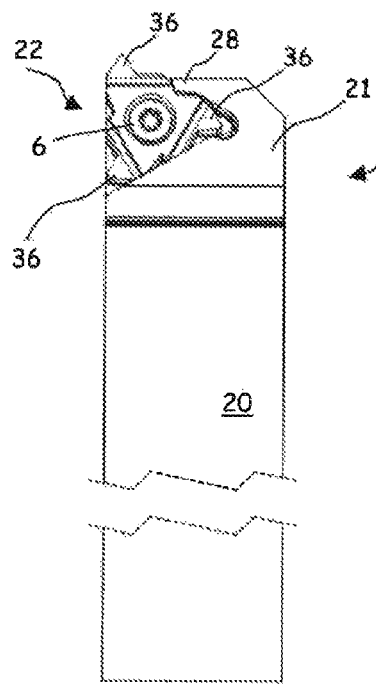
FIG. 3 is a top view of the cutting tool of FIG. 1.
Figure 4:
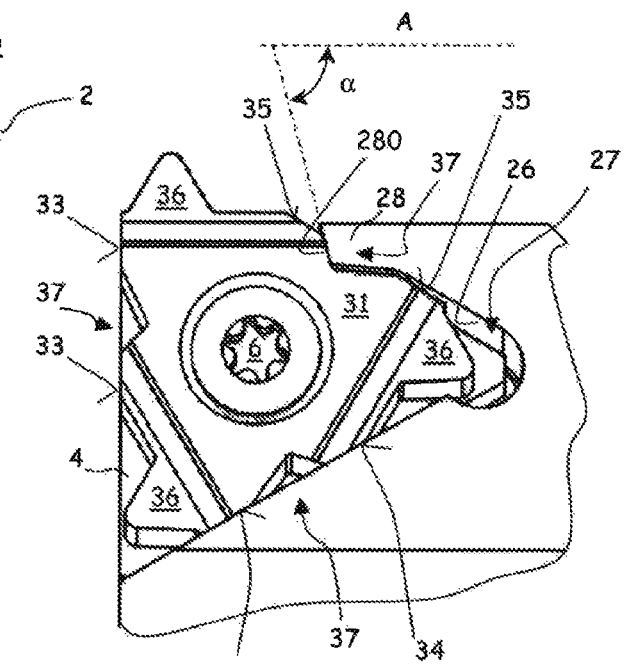
FIG. 4 is a detail of the top view of the cutting tool of FIG. 3.

FIGS. 1 to 4 show a cutting tool 1 comprising a tool holder 2 and a cutting inserts 3, wherein FIG. 1 is an isometric view of the cutting tool 1, FIG. 2 is a exploded view of the cutting tool 1, FIG. 3 is a top view of the cutting tool 1 and FIG. 4 is a detail of the top view of the cutting tool 1 of FIG. 3.

The cutting insert 3 is shown in more detail in FIGS. 5 and 6, wherein FIG. 5 is a top view of the cutting insert 3 and FIG. 6 is an isometric view.

The cutting tool 1 shown in the figures further comprises an anvil 4 and two clamping screws 5, 6 for the anvil 4 and for cutting insert 3.

The tool holder 2 is provided with a shank 20 to be attached to a non-depicted lathe and a forward protrusion 21. At a distal end region of the forward protrusion 21 of the tool holder 2, a pocket 22 is provided for receiving the cutting insert 3 and the anvil 4.

The pocket 22 is provided with threaded hole 23 for receiving the clamping screw 6, wherein the threaded hole 23 extends essentially perpendicular to a top surface of the cutting tool 1. The cutting insert 3 and the anvil 4 are provided with respective through holes 30, 40. The anvil 4 is clamped to the tool holder 2 from a side of the tool holder 2 using the clamping screw 5.

The cutting insert 3 shown in FIGS. 1 to 6 is a threading insert. The cutting insert 3 is therefore also referred to as threading insert or insert. The insert 3 has an essentially triangular basic shape and comprises an upper face 31 and a lower face 32 essentially parallel thereto. The upper face 31 and the lower face 32 are perpendicularly connected by three side surfaces 33, 34, 35. In the depicted embodiment, the cutting insert 3 is provided with three identical cutting corners 36. Each cutting corner 36 is provided with a cutting edge formed at a transition region to the upper face 31.

In the depicted embodiment, only one cutting tooth is provided on each cutting corner 36. The cutting insert 3 is therefore also referred to as single point insert. Single point inserts may be used to reduce the load acting on the insert 3 during turning. As a result, a feed rate and/or an infeed depth may be increased, thereby the overall machining time may be reduced. In the depicted embodiment, the cutting corners 36 each have a protruding direction that is inclined with respect to a bisector of an opposing side surface 33, 34, 35. In other embodiments, the cutting corners have a protruding direction that coincides with the bisector of the opposing side surfaces. As can be best seen in FIG. 6, a top surface of the cutting corners 36 is inclined with respect to the upper face 31.

The cutting insert 3 is releaseably securable in the pocket 22 of the tool holder 2 for presenting one active cutting corner 36, whereas the two passive cutting corners 36 are received in the pocket 22. The pocket 22 is provided with a base support surface 24 and two lateral support surfaces 25, 26. In the embodiment shown in FIGS. 1 to 4, the base support surface 24 of the pocket 22 is provided parallel to a face of the tool holder 2 that is generally oriented as a top face of the cutting tool 1 in use. The pocket 22 is open towards a side perpendicular to the base support surface 24 facing the feed direction is use allowing for an easy manufacturing of the pocket.

One lateral support surface 26 confines the pocket 22 towards the front end of the tool holder 2. The length of this lateral support surface 26 is chosen to allow the active cutting corner 36 to be presented to the front end.

When placing the insert 3 in the pocket 22, two side surfaces 35, 34 of the insert 3 abut the lateral support surfaces 26, 25 of the pocket 22, respectively. An undercut 27 is provided at the juncture of the lateral support surfaces 25, 26 in order to protect the passive cutting corner 36 of the insert 3, which is disposed between these two side surfaces 35, 34 of the insert 3. In the depicted embodiment, the lateral support surfaces 25, 26 are stepped in the axial direction of the insert 3 for providing different abutment regions for the anvil 4 and the cutting insert 3.

The depicted tool holder 2 is further provided with a projection 29, on which the active cutting corner 36 is placed in use. The form of the projection 29 is adapted to the form of the cutting corner 36, in order to avoid an interference of the projection 29 with the work piece in use.

In accordance with the invention, at least one of the side surfaces 33, 34, 35, in the depicted embodiment all three side surfaces 33, 34, 35 of the insert 3, is/are provided with a notch 37 for receiving a rib element 28 provided at least at one of the lateral support surfaces 25, 26 of the pocket 22. In the depicted embodiment, only one rib element 28 is provided. The rib element 28 is arranged at the free end of the lateral support surface 26 that confines the pocket 22 towards the front end of the tool holder 2. A face of the rib element 28 facing in the feed direction in use is referred to as front face 280.

The notches 37 are provided essentially in the middle of each side surface 33, 34, 35. Thereby an interference with the cutting corners 36 is avoided and the size of the notches is optimized.

The rib element 28 and the notch 37, with which the rib element 28 engages, form an end stop or axial stopper for the cutting insert 3. In use, the cutting tool 1 approaches the work piece (not shown). In preferred operations, the cutting tool 1 approaches the work piece with a flank infeed or a modified flank infeed. The shape and the size of rib element 28, in particular of the front face 280, are chosen for ensuring a sufficient rigidity and stability of the cutting tool 1.

In the depicted embodiment, the notch 37 and the rib element 28 have a basic shape of an irregular triangle. The form of the notch 37 and the rib element 28 is chosen to provide a front face 280 at a defined angle α with respect to an axis A of the work piece (not shown). The angle α with respect to an axis A of the work piece is chosen between 60° and 90°. The front face 280 faces towards the open side of the pocket 22 allowing for an easy insertion of the insert 3.

As mentioned, in the depicted embodiment, the rib element 28 is provided at the lateral support surfaces 26 delimiting the pocket 22 towards the front end of the tool holder 2. This allows balance cutting forces acting on the active cutting corner close to an application point. In addition, the rib element 28 is formed with a sufficient height or depth of the front face 280 ensuring a high rigidity.

For placing the anvil 4 in the pocket 22 having a rib element 28, the anvil 4 is also provided with a notch 41. As the angular orientation of the anvil 4 is not altered when revolving the cutting insert 4, only one side face of the anvil 4 is provided with a notch 41.

FIG. 7 shows a cutting tool 1 comprising a tool holder 2 and a cutting inserts 3 according to a second embodiment in an isometric view. The cutting insert 3 of FIG. 7 is shown in more detail in FIGS. 8 and 9, wherein FIG. 8 is a top view of the cutting insert 3 and FIG. 9 is an isometric view.

The cutting tool 1 shown in FIG. 7 is adapted for grooving operations. Although in contrast to the embodiment shown in FIGS. 1 to 6, in use the cutting tool 1 shown in FIG. 7 is arranged such that a face 200 of the tool holder 2 is a top face and a base support surface 24 of a pocket 22 of the tool holder 2 is provided perpendicular to that face 200, the terms used above are maintained.

The cutting insert 3 shown in FIGS. 7 to 9 is also referred to as grooving insert or insert. The insert 3 has a generally triangular shape with an upper face and a lower face (not-visible in FIG. 7) arranged parallel thereto. The insert 3 is further provided with three side surfaces 33, 34, 35 arranged essentially perpendicular to the upper surface 31. At the ends of each side surface cutting corners 36 with cutting edges are formed. The cutting edges extend at least essentially perpendicular to the upper surface 31.

The pocket 22 has a base support surface 24, which due to its orientation in use is also referred to as side support surface. The pocket 22 is further provided with two lateral support surfaces 25, 26 also referred to as back wall and front wall, respectively, due to the orientation in use. When placed in the pocket 22, two side surfaces 35, 36 of the insert 3 abut the two lateral support surfaces 25, 26.

One lateral support surface 26 confines the pocket 22 towards the front end of the tool holder 2. The length of this lateral support surface 26 is chosen to allow the active cutting corner 36 to be presented to the front end. This lateral is also referred to as front wall.

The insert 3 is secured within the pocket 22 of the tool holder 2 using a clamping screw 6. In the depicted embodiment, no anvil is disposed between the cutting insert 3 and the pocket 22.

In accordance with the invention, at least one of the side surfaces 33, 34, 35, in the depicted embodiment all three side surfaces 33, 34, 35 of the insert 3, is/are provided with a notch 37 for receiving a rib element 28 provided at least at one of the lateral support surfaces 25, 26 of the pocket 22. In the depicted embodiment, the rib element 28 is provided at the free end of the front wall 26 of the pocket. A face of the rib element 28 facing the top face 200 is referred to as front face 280. Providing the rib element 28 at the front wall 26 allows forming the rib element 28 with a sufficient height or depth of the front face 280, thereby ensuring a high rigidity, wherein the active cutting corner 36 rests on the rib element 28. The notches 37 are provided essentially in the middle of each side surface 33, 34, 35.

In the depicted embodiment, all three side surfaces 33, 34, 35 are provided with notches 37. This allows positioning the insert 3 in the pocket 22 with three different orientations for selectively choosing one of the cutting corners 36 as active cutting corner. The notch 37 and the rib element 28 form an axial stopper for the cutting insert 3, wherein the active cutting corner 36 rests on the rib element 28. Hence, the notch 38 allows for a stable support of the active cutting corner 36 in use.

The invention claimed is:

1. A cutting tool comprising a tool holder with a pocket and a cutting insert in the shape of a polygon having side surfaces, wherein:
   the pocket is provided with a base support surface, a first lateral support surface and a second lateral support surface,
   an undercut is provided at a juncture of the first and second lateral support surfaces,
   the cutting insert is releaseably securable in the pocket with a first side surface of the insert abutting the first lateral support surface of the pocket and a second side surface of the insert abutting the second lateral support surface of the pocket, and such that a cutting corner, which is disposed between the first side surface and the second side surface, is supported adjacent or in said undercut, without touching the lateral support surfaces of the pocket,
   all side surfaces of the insert are provided with a notch extending in an axial direction of the insert,
   the first lateral support surface is provided with a rib element protruding from the first lateral support surface and extending in an axial direction of the insert, wherein the rib element is complementary to said notches and interacts with a notch at the first side surface for providing an end stop of the cutting insert in the pocket,
   the second lateral support surface is not provided with a rib element,
   the second side surface contacts the second lateral support surface in two contact zones adjacent to the notch provided on the second side surface, and
   the pocket is open towards at least one side perpendicular to the base support surface, wherein the rib element has a front face facing towards the open side of the pocket; and
   wherein said cutting insert is triangular with three cutting corners, whereby when said cutting insert is releaseably secured in the pocket, one cutting corner is presented while the other two cutting corners are received in the pocket without touching the lateral support surfaces of the pocket.

2. The cutting tool according to claim 1, wherein the cutting insert is a threading insert releaseably securable in the pocket having a base support surface arranged at least essentially parallel to a top surface of the cutting tool.

3. The cutting tool according to claim 1, wherein the cutting insert is a grooving insert releaseably securable in the pocket having a base support surface arranged at least essentially perpendicular to a top surface of the cutting tool.

4. The cutting tool according to claim 1, wherein the cutting insert is an indexable cutting insert.

5. The cutting tool according to claim 1, wherein the first lateral support surface confines the pocket towards the front end of the tool holder.

6. A tool holder for a cutting tool, the cutting tool comprising a tool holder and a cutting insert in the shape of a polygon having side surfaces,
   wherein:
   the tool holder is provided with a pocket having a base support surface and first lateral support surface and a second lateral support surface, and an undercut at a juncture of the first and second lateral support surfaces,
   in which pocket the cutting insert is releaseably securable with a first side surface of the insert abutting the first lateral support surface of the pocket and a second side surface of the insert abutting the second lateral support surface of the pocket, and such that a cutting corner, which is disposed between the a first side surface and the second side surface, is supported adjacent or in said undercut, without touching the lateral support surfaces of the pocket,
   the first lateral support surface is provided with a rib element protruding from the first lateral support surface and extending in a direction at least essentially perpendicular to the base support surface and arranged for interacting with a complimentary notch provided at the first side surface of the cutting insert for providing an end stop of the cutting insert in the pocket, the second lateral support surface is not provided with a rib element, the pocket is open towards at least one side perpendicular to the base support surface, wherein the rib element has a front face facing towards the open side of the pocket, and wherein said cutting insert is triangular with three cutting corners, whereby when said cutting insert is releaseably secured in the pocket, one cutting corner is presented while the other two cutting corners are received in the pocket without touching the lateral support surfaces of the pocket.

7. The tool holder according to claim 6, wherein the front face is arranged with respect to an axis of a work piece at an angle that is larger than 30°.

8. The tool holder according to claim 7, wherein the front face is arranged at an angle of between 60° and 90°.

9. The tool holder according to claim 6, wherein the first lateral support surface confines the pocket towards the front end of the tool holder.

* * * * *